Jan. 12, 1932. H. W. LORMOR 1,841,194
APPARATUS FOR LEAD BURNING STORAGE BATTERY TERMINAL POSTS AND CONNECTERS
Filed Sept. 10, 1923    3 Sheets-Sheet 3
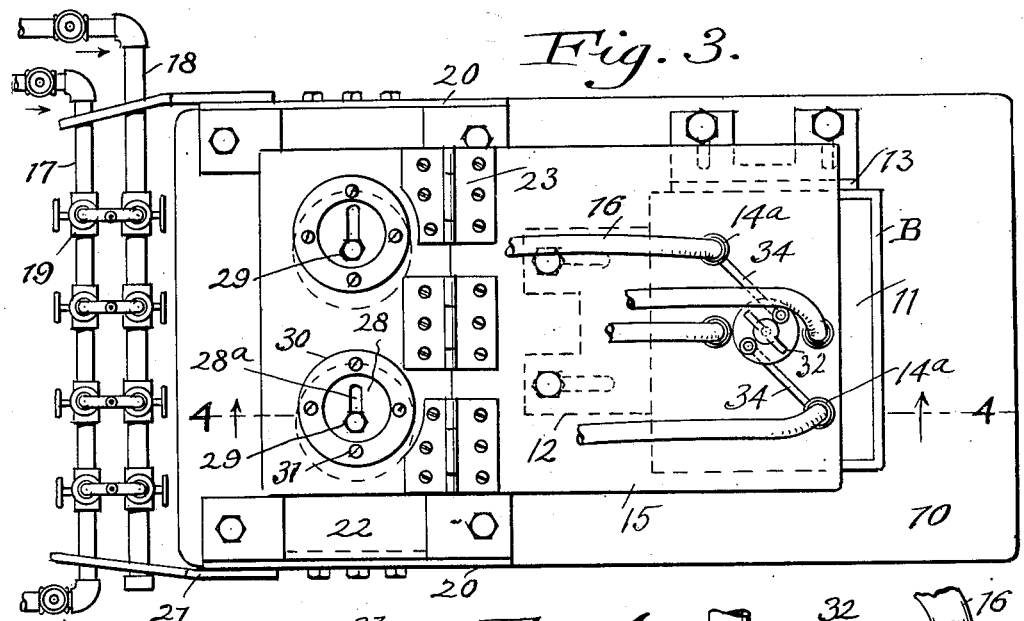
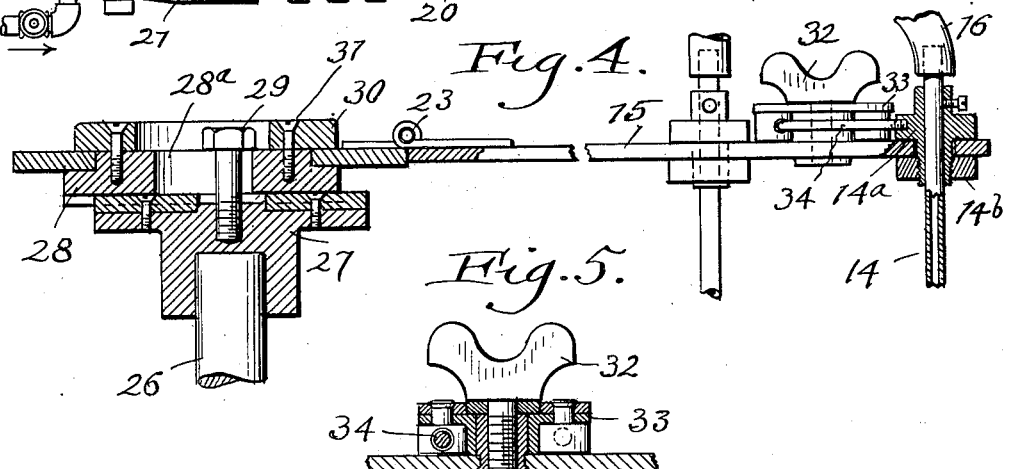
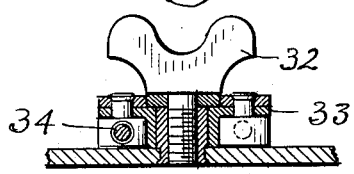
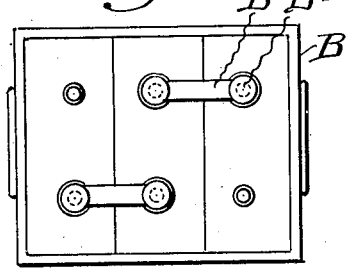
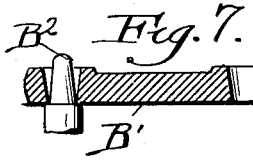
Inventor
Henry W. Lormor
Thurston Knost Hudson
attys Patented Jan. 12, 1932

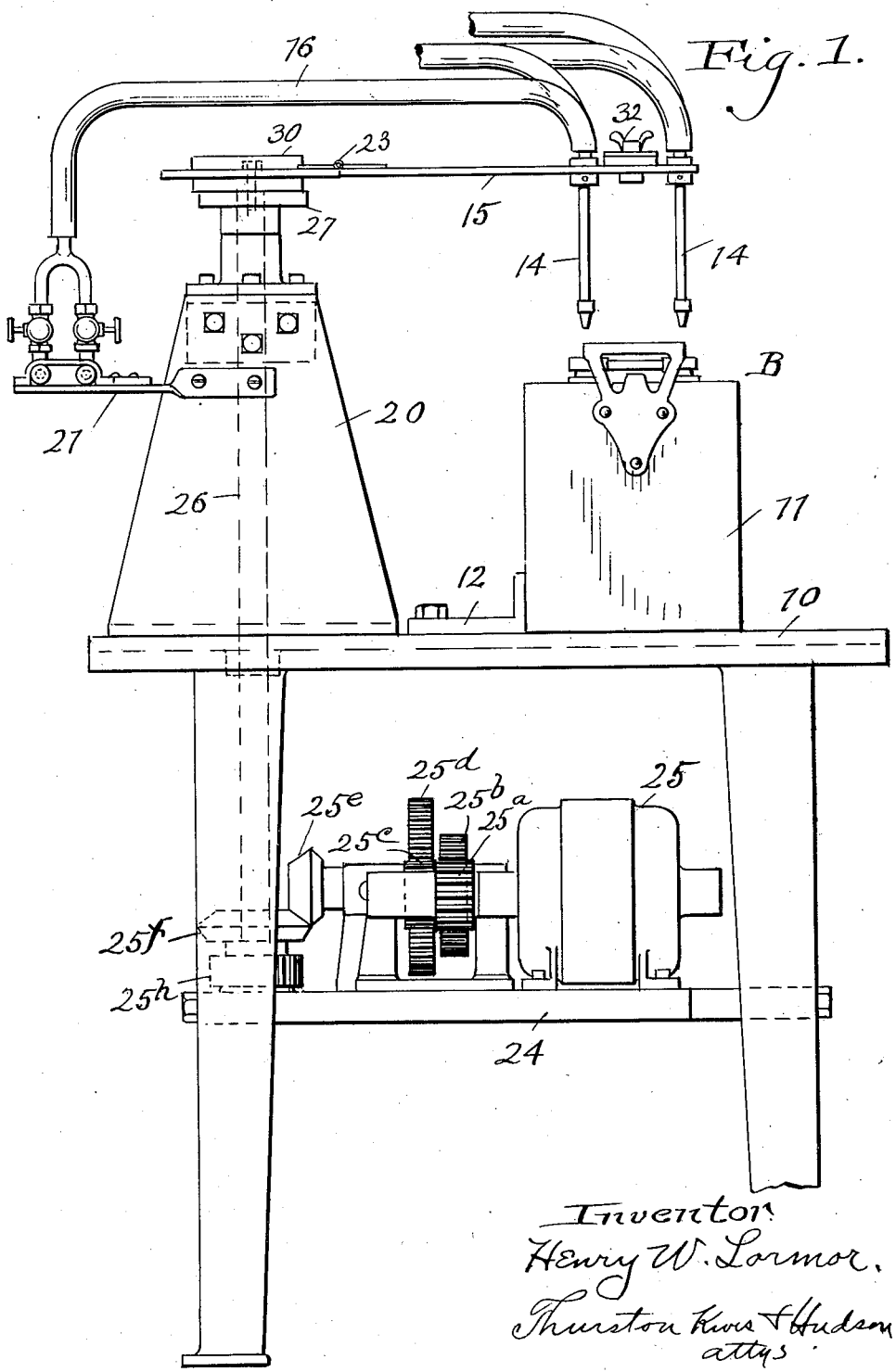

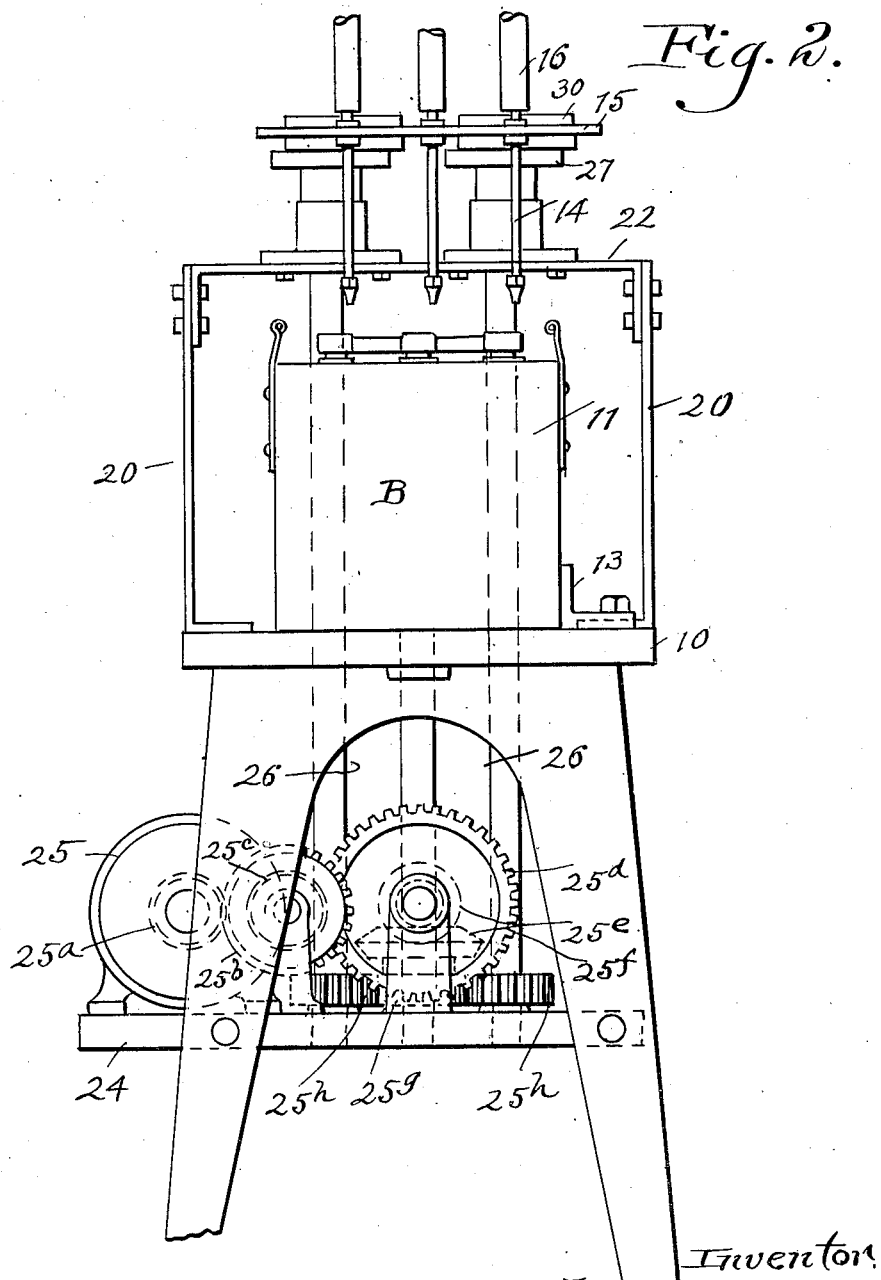

1,841,194

UNITED STATES PATENT OFFICE

HENRY W. LORMOR, OF CLEVELAND, OHIO, ASSIGNOR TO WILLARD STORAGE BATTERY COMPANY, OF CLEVELAND, OHIO, A CORPORATION OF WEST VIRGINIA

APPARATUS FOR LEAD BURNING STORAGE BATTERY TERMINAL POSTS AND CONNECTERS

Application filed September 10, 1923. Serial No. 661,879.

This invention relates to an apparatus for lead burning together the terminal posts and connecters of storage batteries.

Storage batteries are provided with a number of cells having upstanding terminal posts to which connecters are applied. The adjoining cells are connected in series by cross connecters which are always lead burned to the terminal posts, and the two end cells are equipped with connecters to which the two outside or flexible conductors are designed to be connected. The latter connecters are in some instances lead burned to the posts, but generally they are clamped thereto.

The connecters which are to be lead burned to the posts are provided with sockets or openings which are placed over the connecters, each cross-connecter consisting of a strap having sockets at its opposite ends designed to be fitted over the two posts of adjoining cells which are to be connected together. Each post is separately lead burned to its associated connecter by an oxy-acetylene flame, the operator applying the flame separately to each post and connecter to be lead burned together until the several lead burning operations are completed for a battery. This work is usually done by a small flame which the operator moves about in a small circle to melt down the post and to lead burn the post and connecter together. As the lead burning has been done heretofore, it requires rather skilled operators to do good work and uniform work, and the cost of the lead burning is a considerable factor in the expense of the battery, it being understood that the greater the number of cells, the more time and labor there is required to accomplish the lead burning.

One of the objects of the present invention is to provide a method and means whereby the lead burning operations for the entire battery can be accomplished at the same time. Further the invention aims to obtain more uniform results than is possible by the hand method employed heretofore, and with the operator accomplishing the lead burning at the different posts successively or in sequence.

Generally speaking, therefore, it may be said to be one of the principal aims of the invention to eliminate the human element in the lead burning operation and to provide a method and means whereby the work is done mechanically, and all lead burning operations performed at the same time and in uniform manner, thus producing better results and reducing the cost of the lead burning operation.

In the accompanying sheets of drawings I have shown one way of carrying out the invention, and in the drawings, Fig. 1 is a side view of the lead burning machine; Fig. 2 is an end view of the machine as seen from the left of Fig. 1; Fig. 3 is a top plan view; Fig. 4 is a sectional view on an enlarged scale substantially along the line 4—4 of Fig. 3; Fig. 5 is an enlarged detail sectional view of a portion of the burner adjuster to adjust the spacing of the burners to accommodate cells of different sizes; Fig. 6 is a top plan view of the battery of Figs. 1, 2 and 3 showing the connecters and posts which are to be lead burned together; and Fig. 7 is a cross-sectional view through one of the connecters and showing one of the posts.

Referring now to the drawings, the lead burning machine includes a table 10 on which is adapted to be placed the battery 11, whose connecters and terminal posts are designed to be lead burned together. The battery B will be placed on a table for the lead burning operation in a definite postion with respect to the burners by placing the one side and one end against suitably positioned and generally adjustable angles 12 and 13.

It is entirely immaterial to my invention how many cells the battery has as this involves simply a change in the number of burners. In the apparatus herein illustrated the lead burning is accomplished by four burners. This means that the battery has three cells requiring two cross connecters B' which are to be lead burned at opposite ends to the posts B² of adjoining cells. For a four cell battery there will be required three cross connecters and therefore six burners, etc.

The burners which are shown at 14 will have a spacing and arrangement relative to one another corresponding to the spacing and arrangement of the posts of the batteries which are to be lead burned to the connecters so that the flames can be simultaneously directed from the points or nozzles of the burners onto the parts to be melted down or lead burned together. These burners are carried by a support 15, and in this instance extend down vertically from the support toward the battery 11. This support 15 is given an oscillatory movement as will be explained presently, so that the flames can be moved in a circle to melt down the post properly and to lead burn it in the right way to the connecter just as a single burner and flame are now moved about by hand. The burners 14 are supplied with suitable gas such as oxygen and acetylene in the right proportions by tubes 16 to which supply pipes 17 and 18 are connected through valves 19.

On the table 10 behind the position in which the battery 11 is placed, are upright arms 20 from which the pipes 17 and 18 are supported by means of brackets 21. The upright arms or standards 20 are connected at the top by a cross piece 22 on which the burner support 15 is indirectly supported. The burner support 15 consists in this instance of two parts connected by hinges 23, the forward part carrying the burners and the rear part engaging with the actuating means to be next described. This enables the burners to be swung up and back out of the way whenever desired, the tubes 16 being flexible so as to admit of this movement.

For the purpose of giving the burners a simultaneous rotary motion so that the individual flames will tarvel around the peripheries of the terminal posts, the burner support is given an oscillatory movement. While I do not desire to be confined to the particular mechanism herein illustrated for imparting the oscillatory movement, I preferably use for this purpose a pair of eccentrics which may be and are preferably motor driven, and the throw of which will determine the diameter of the circular path of movement of the flames.

In the embodiment herein illustrated, I provide on a platform 24, beneath the table 10, a motor 25, which motor rotates two vertical shafts 26. While the specific mechanism here illustrated between the motor and the shafts need not be utilized, in this instance the motor rotates a pinion 25a which drives a gear 25b rotating with a pinion 25c engaging a gear 25d which rotates with a bevel gear 25e engaging a bevel gear 25f with its axis vertically disposed. Rotating with this bevel gear 25f is a pinion 25g located between the two vertical shafts 26. This pinion engages and rotates in the same direction a pair of pinions 25h at the lower ends of the shafts 26.

The shafts 26 at their upper ends are provided with disk-like heads 27 on which are mounted eccentrics 28 engaging in circular openings in the rear part of the burner support 15. The face of the head 27 is transversely slotted and the eccentrics 28 have portions engaging in the slots so that the eccentricity can be varied when desired. In this instance, each eccentric has a slot 28a, and the eccentric is designed to be clamped down against the head 27 in any desired adjusted position by a screw 29 extending through the slot 28a. Furthermore in the embodiment shown, the burner support is held down in operative relation with the eccentric 28 by a clamping ring 30 which is secured to the eccentric by screws 31 or otherwise.

Thus it will be seen that when the motor is in operation, the eccentrics 28 are rotated by the vertical shafts 26, and the movement of the eccentrics causes an oscillatory motion to be given to the burner support 15, the throw of the eccentrics being such as to give the lower ends of the burners the desired circular motion, the diameter of the circular path of movement being capable of adjustment by varying the position, and therefore throw of the eccentrics 28.

Thus when the machine is provided with the proper number of burners, properly located with reference to the location of the terminal posts and connecters of a battery to be placed beneath the burners, all the lead burning operations are performed at the same time and in practically the length of time that the operator could lead burn one post to the end of one strap or cross connecter by the hand methods used heretofore.

In practice the operator does not touch the burners, but simply places a battery in proper position on the table, and when the lead burning operations are performed, removes the battery and places another battery in lead burning position. In this manner, the batteries are lead burned in rapid succession, and assuming that the operator applies to and removes the batteries from the table at the right times (and this is done properly without difficulty), more effective work is done than when the lead burning is done by hand with a single burner; and furthermore, all the posts and connecters at the top of a battery will be lead burned together in exactly the same manner, or uniformly, and in a short space of time.

Thus it will be seen that as long as the batteries of a given size and of a given number of cells are being lead burned, no changes or adjustments either in the number of burners or in the arrangement of the burners, or in the path of movement of the burners need be made. Of course, when it is desired to lead burn batteries of a different number of cells it will be necessary to change the number of burners.

It is sometimes the case that batteries having the same number of cells vary as to ampere hour capacity, and therefore in the number of plates of each cell. In such batteries the distance between the posts of each cell remains the same, but the width of the cells and therefore the distance between the posts of adjoining cells will be different for a battery of one ampere hour capacity than for a battery of a different ampere hour capacity.

In the machine which I have designed and herein illustrated, provision is made for adapting the burners to batteries of different ampere hour capacities. For a three cell battery as herein illustrated, it is only necessary to move the two outside burners, i. e. the burners for operating on the two end cells toward or from the two burners which operate on the intermediate cell. To admit of this adjustment the burners or burner tubes 14 are secured in flanged bushings 14a which extend through openings in the burner support 15, which flanged bushings are secured in place by clamping nuts 14b screwed onto the bushings as shown at the right hand side of Fig. 4. In order that the burners may be made adjustable for batteries of different ampere hour capacities, the openings through which the flanged bushings of the two outermost burners extend, are elongated, or in the form of slots, making it possible to adjust them as desired. The adjustment may be made to these two burners individually, or if desired, simultaneously, and to bring this about, I provide on the burner support between the two central burners, a rotary adjuster 32, in this instance in the form of a thumb nut connected to a rotary member 33 which is connected by links in the form of pins 34 with the flanged bushings 14a of the two outermost burners. Therefore, when the nuts 14b of the flanged bushings are first loosened, by turning the thumb nut 32, the two outermost burners can be moved toward or from each other as desired, and when properly positioned will be tightened in position by tightening of the nuts 14b.

It will therefore be seen that I have provided in this lead burning machine a support carrying a plurality of burners, which support is movably arranged so that all the terminal posts of a battery can be lead burned to their associated connecters at the same time; also provision is made for varying the path of the movement, i. e. the diameter of the circular path through which the flames are caused to travel, and provision is made for adjusting the burners so as to adapt them for batteries of the same number of cells but of different widths.

It will be understood, of course, that while I have shown my invention applied for lead burning the posts and connecters for a battery having three cells, the invention is applicable equally well for lead burning batteries of any number of cells, it being necessary only to provide a burner support carrying the proper number of burners properly spaced, and to provide the necessary connections for supplying gas to these burners in the same or equivalent manner as herein illustrated. Any such burner support, regardless of the number of burners may be oscillated in precisely the same way as herein illustrated, and the eccentric throw can, of course, be varied as described herein.

Furthermore, regardless of the number of burners that are carried by the support, the lateral spacing of the burners to adapt the apparatus for batteries of different ampere capacities or different widths of cells, may be made. When the apparatus is adapted for lead burning batteries having more than three cells, the burners may be individually adjusted by hand and fastened in the desired positions.

While I have shown one form of apparatus which may be utilized in accomplishing the above results, other ways of carrying out the invention may be employed, and I therefore aim in my claims to cover all modifications which do not involve a departure from the spirit and scope of my invention.

Having described my invention, I claim:

1. In an apparatus for lead burning together terminal posts and connecters of a storage battery, a support on which the battery is adapted to be placed, a plurality of burners arranged above the battery with a spacing corresponding to the spacing of the terminal posts of the battery, and means for actuating said burners so that their flames may be directed down onto the posts and will be moved around each post so as to simultaneously lead burn the posts and connecters.

2. In an apparatus for lead burning the terminal posts and connecters of a storage battery, a plurality of burners having a predetermined spacing with respect to the posts of the battery, a support for said burners, means for actuating said support so that the tip of each burner will have a circular movement, and means for varying the diameter of the circular path of movement.

3. In an apparatus for lead burning the posts and connecters of a storage battery, a plurality of burners, a support for the burners, said support holding the burners so that the tips thereof have a predetermined spacing with respect to the spacing of the terminal posts of the battery to be lead burned, eccentrics engaging said support so as to impart an oscillatory movement to each of said burners, means for rotating said eccentrics, and means for varying the throw of said eccentrics.

4. In an apparatus for lead burning the posts and connecters of a storage battery, means for supporting a battery to be lead burned, a plurality of burners supported so that the tips thereof have a predetermined spacing with respect to the posts of the battery, means for causing a relative circular movement between each flame and its adjacent terminal post, and means whereby the extent of said relative circular movement may be varied.

5. In an apparatus for lead burning the posts and connecters of a storage battery, means for supporting the battery to be lead burned, a plurality of burners, a support for the burners holding the latter so that the tips thereof have a predetermined spacing with respect to the posts of the battery, means for causing a relative circular movement between each flame and its adjacent terminal post, and means whereby the spacing of the burners in said support may be varied.

In testimony whereof, I hereunto affix my signature.

HENRY W. LORMOR.